July 18, 1961     H. R. JAQUITH     2,992,552
INDICATING INSTRUMENT
Filed Sept. 16, 1959

INVENTOR.
HOWARD R. JAQUITH
BY P. J. Young, Jr.

2,992,552
INDICATING INSTRUMENT
Howard R. Jaquith, Rochester, N.Y., assignor to Taylor Instrument Companies, Rochester, N.Y., a corporation of New York
Filed Sept. 16, 1959, Ser. No. 840,354
6 Claims. (Cl. 73—1)

This invention relates to calibration of indicating instruments of the type wherein motion, transmitted through a motion transmitting linkage, causes a pointer connected to said linkage to sweep over a scale of indicia, such that the positions of said pointer in terms of said indicia are measures of said motion.

Instruments of the sort described are generally provided with scale plates bearing said indicia, but so located that access to said linkage is substantially completely prevented by said plate, at least from a position wherein the indications of said pointer on said scale can be conveniently or reliably determined at the same time. On the other hand, the aforesaid linkage is in effect an array of machine elements, such as interconnected cranks, levers, gears, or the like, wherein the interconnections and/or the elements themselves are made susceptible of variation or adjustment so that the indicated scale-measure of motion transmitted by the linkage accurately bears some definite relation to the said motion. Since the instrument generally is involved in some sort of supporting structure, e.g., a casing, panel, or the like, the linkage is substantially enclosed by structure preventing ready access to the said linkage.

According to my invention, I provide both means and procedure for adjusting the linkage of an instrument as aforesaid—terming such adjustment calibration, for short, hereinafter—of such nature as to require a minimum of effort and disturbance attendant upon getting at the said linkage for the purpose of calibration, a minimum of structural modification of the instrument for purpose of calibration, and at the same time permitting easy and accurate calibration of the instrument.

Figure 1:
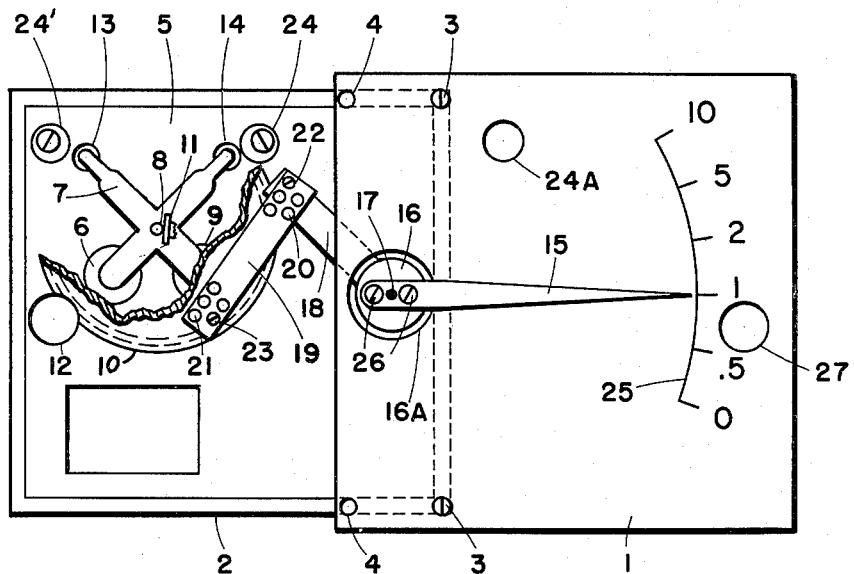
Figures 2, 3:
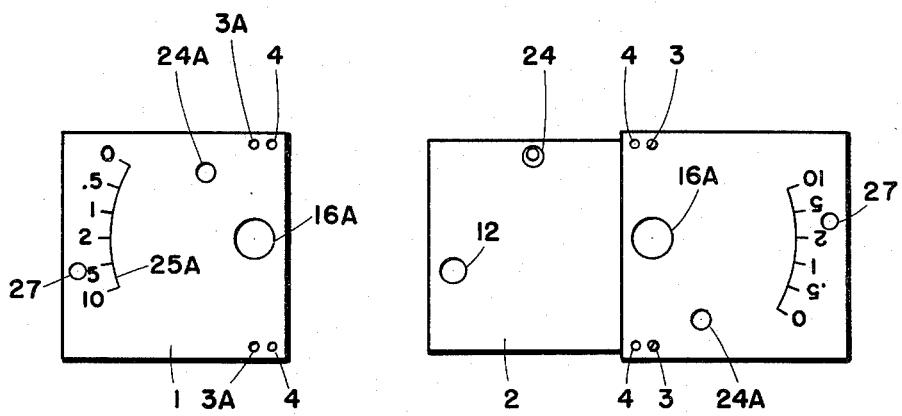

FIGURE 1 is a more or less detailed diagrammatic view of a so-called ratio relay according to my invention;
FIGURE 2 illustrates the front of scale plate 1, i.e., the side thereof not showing in FIGURE 1;
FIGURE 3 illustrates a modification of the invention.

In FIGURE 1, a scale plate 1 and an open-faced casing 2 are shown secured together, as by means of screws 3 tapped into convenient parts of the instrument, in this instance the corners of casing 2, and passing through holes 3A (FIGURE 2) in plate 1. As shown, plate 1 has been fastened to the casing 2 so as to leave the contents thereof exposed, whereby calibration can be affected by adjustment of said contents. In normal use, however, the screws 3 are used to secure plate 1 to the casing, and over the relay, indicated generally by reference numeral 5, by the plate corners, which are provided with apertures 4 for this purpose.

For the sake of illustration, the relay 5 may be considered to be basically like that disclosed in FIGURES 1 and 2 of the copending application 626,537 of Howard R. Jaquith, filed December 5, 1956, and assigned to the assignee of the present application.

In brief, relay 5 includes input bellows 9 and output bellows 6, joined by a crossbar or plate 7. For technical reasons, it is preferable to employ the baffle and nozzle mechanism of the controller shown in FIGURE 3 of the aforesaid copending application rather than the movable nozzle 10 shown in FIGURE 1 of said copending application. Hence, plate 4 is shown provided with a baffle-operating pin 8 corresponding to ball 27 of said FIGURE 3. In order to avoid a confusion of detail, of the baffle and nozzle mechanism itself, nothing more is shown but the gear 10, corresponding to gear 70 of said FIGURE 3, and the lower end 11 of a baffle-operating lever, such as shown at 30 in said FIGURE 3. To complete the relay, springs 13 and 14 are included to balance bellows 9 and 6 and, though not shown, a pressure input connection would be provided for bellows 9, a source of constant pneumatic pressure would be connected to the nozzle (not shown) of said baffle and nozzle mechanism, and to bellows 6, and bellows 6 would be provided with an output connection for connection to some pressure responsive device (not shown) desired to be actuated in accordance with the pressure in bellows 6.

It is believed that the foregoing more than suffices to sketch in the salient features of a particular one of many instrumentalities of the type having indicating means for indicating certain information as to the operation thereof, and to which the principles of my invention would apply.

In any event, it will be apparent from the said copending application that a given input pressure applied in bellows 9 will be responded to by production in bellows 6 of an output pressure having a relation to the said given input pressure that depends on the angular position of baffle-end 11 about baffle-operating pin 8. In turn, such angular position is determined by that of gear 10. The gear 10 would usually be set by a knob 12, or the like, geared thereto and projecting out of casing 2 to some extent for easy manipulation.

In this instance, it is desired to have a range of varying ratios of input pressure to output pressure corresponding to about one-quarter turn of gear 10. While the angular position of gear 10 can be determined by direct reference to the gear itself, the relationship between ratio and gear position is non-linear; hence, it is convenient to provide separate indicating means consisting of a pointer 15 mounted on an enlarged portion 16 of a shaft 17, and a scale 25 on plate 1.

In order to provide a certain amount of amplification of the turning of gear 10, as well as substantial equi-spacing, as shown, of the numbers expressing the output to input ratio determined by turning gear 10 to given positions, linkage consisting of a link 18 and a link 19 are provided connected, as shown, to each other and to shaft 17 and to gear 10, one end of link 18 being fixed to shaft 17, one end of link 19 being pivoted to gear 10 by means of a pivot pin 23 projecting from gear 10 through one of several holes 21 in said one end, and the other end of link 19 being pivoted to the other end of link 18 by means of a pivot pin 22 projecting from link 18 through one of several holes 20 in the said other end of link 19.

For the position of pointer 15 relative to scale 25 to reflect accurately the actual pressure ratio, it is necessary to provide for adjustment of various elements of the relay. Among other things, one may adjust the springs 13 and 14, there being shown in FIGURE 1 a pair of screw-type adjustment devices 24 and 24' for the purpose, and plate 1 having a hole 24A therein through which a screwdriver or the like can be inserted to get at adjustment device 24 when the plate 1 covers the opening of casing 2. If desired, a like hole may be provided in plate 1 for adjusting device 24'.

However, to adjust the fit of the scale 25 to the actual pressure ratios established by adjusting the angular position of gear 10, it is necessary to adjust the effective length of link 19 by choosing suitable located holes 20 and 21 for pins 22 and 23, which is most conveniently done by removing scale plate 1 to expose the mechanism of relay 5.

The basic principle of calibration is to establish known values of pressure ratio, i.e., known by separate measurement of input pressure and the resultant output pressure and calculation of the actual ratio therebetween and to adjust the relay 5 so that the angular position of pointer 15 will indicate said values when said values exist. On the other hand, ideally neither scale nor pointer should be disturbed for the purpose of calibration. In order to attain this result without having to resort to such expedients as providing slots, large holes or removable panels in plate 1, auxiliary scale plates, or other structural complications to that or equivalent effect, according to my invention, there is provided the scale 25 on what is normally the back of plate 1, whereby by turning both plate and pointer over so that they project beyond the side of casing 2, the instrument mechanism may be adjusted without interference from plate 1.

For neatness of appearance, cleanliness, and maximum coverage of the mechanism in casing 2, it is desirable that the scale plate have a minimum amount of holes, slots, and the like. Moreover, holes for access to adjustments should be kept to a minimum in order to avoid ill-considered or mistaken attempts at adjustment in the field. For example, in the instrument of FIG. 1, adjustment of the effective length of lever 19 is not intended to be carried out in the field, hence it is undesirable to expose lever 19 to overly-easy access.

The means for securing plate 1 to casing 2, in either calibrating position or in normal use position are so constructed and arranged that pointer 15 preserves the same relationship to scale 25 as to scale 25A on the front of the plate (see FIGURE 2), which is used when setting the particular pressure ratio desired in normal use of the instrument with plate 1 secured to casing 2 over relay mechanism 5.

The indicia of scales 25 and 25A correspond to the scale of numerical values of pressure ratio expected to be required in use of the relay. Although the details of the scheme of carrying out the adjustment of said springs and said lever 19 are not the concern of this application, it should be noted that the inherent design of the instrument is such as to approximate indicated scale change in ratio to actual change in ratio. Therefore, lever 19 is provided with holes 20 and 21 of sufficient number and spread as to allow enough leeway in selecting a hole 20 for pin 22 and a hole 21 for pin 23 such that an effective length of said lever 19 can be found as to refine said approximation to a specified tolerance in the matter of how closely indicated ratio for a given setting of gear 10 corresponds to the ratio actually existing between output and input pressure at said setting.

Once springs 13 and 14 and link 19 are properly adjusted with the instrument in the state shown in FIGURE 1, pointer 15 is removed by unscrewing screws 26 which hold it on enlarged portion 16, and scale plate 1 is removed by removing screws 3. Plate 1 is then turned over to expose the side thereof shown in FIGURE 2, and placed over casing 2 in a position wherein holes 4 coincide with the taps for screws 3 in the corners of casing 2, and all the contents of casing 2 is covered by plate 1. The plate 1 having been turned over, scale 25A, instead of scale 25, is now visible at the front of the instrument. The plate 1 is then secured to the casing 2 by the screws 3, and the pointer 15 is again fastened to enlarged portion 16 but 180 degrees out of its position for calibration, i.e., so as to extend over the instrument and toward scale 25A. The instrument is now ready for normal use as a ratio relay.

The geometry of scale plate and pointer shifting are so designed that pointer 15 has always the same relationship to scale 25A as to scale 25. In the geometry of FIGURE 1, looking at plate 1 as a zero-thickness plane, the scales 25 and 25A are coincident at their ends (and at all points if calibrations are equi-spaced) but one is the reverse of the other insofar as numerical order is concerned. Hence, turning plate 1 over to interchange scales results, for purposes of calibration, in an effect equivalent to a 180 degree shift of a single scale about the axis of deflection of pointer 15.

There are many conceivable ways of arranging holes or the like in the scale plate for the purpose of fastening said plate 1 to casing 2, or other convenient element in more than one position. Merely by way of example, in FIGURE 1, holes 4 may be thought of as having their centers on a line normal to a line through the centers of the holes (not shown) in pointed 15 provided for screws 26. Likewise, for holes 3A and, as for the aforesaid holes in pointer 15, the said line through the centers thereof would intersect the axis of shaft 17. With such arrangement of holes, the same taps in the corners of casing 2 may be used for securing plate 1 to the instrument in both normal use position and calibrating position.

If scales 25 and 25A were not coincident at their ends, or were not at least parallel arcs of the same angle having its vertex at the axis of rotation of shaft 17, a similar result could be obtained, although the pointer-scale shift would not be 180 degrees and therefore the means provided for securing plate 1 to casing 2 might be more complex since calibrating and normal- use positions of plate and pointer would be less alike than in the illustrated construction.

FIGURE 2 is a by now self-explanatory view (to a smaller scale than FIGURE 1) of the other or normal-use side of plate 1, including scale 25A, and need not be further explained. It will also be seen that, in addition to hole 24A, plate 1 has holes 16A and 27 for the purpose of, respectively, providing for projection of shaft 17 therethrough, and to accommodate knob 12, or a shaft on which said knob is mounted.

FIGURE 3 represents a simplification of FIGURE 1. In the species of FIG. 3, plate 1 is to be rotated 180 degrees in its own plane in order to change it from use position to calibrating position, and vice versa, whereby only scale 25A is rquired for both normal use and calibration since, although the scale numerals are upside-down during calibration, their order will be correct in both use position and calibrating position of scale plate 100. That is, the same side of scale plate 100 will be used both in normal use of the relay and in its calibration. As in the species of FIG. 1, pointer 15 is also shifted 180° along with plate 1.

Another simplification of the species of FIGURE 1 would be to locate scale plate mounting holes just halfway between holes 3A and 4, and locate the screw-taps in casing 1 accordingly. Since by this arrangement the axis of shaft 17 and the centers of the first mentioned holes would fall on what amounts to the axis about which plate 1 is flipped over, the same pair of holes would serve for fastening plate 1 to casing 2 in both normal and calibrating position. A similar hole arrangement would, of course, lead to similar results with the species of FIG. 3.

Irrespective of how the plate fastening means are contrived and arranged, the essence of my invention resides in effectively shifting the scale plate about the pointer-deflection axis, shifting the pointer the same amount on its axis and in the same directional sense, without disturbing the angular position of the shaft or the like on which the pointer is mounted.

It is obvious that my invention is applicable to devices other than fluid pressure relays, as for example, pressure gages, and other indicating and/or measuring devices, which may include linkage adjustable for the purpose of causing the indications of the instrument to correspond to the actual pressure or other quantity to be indicated.

Obviously, too, there can be wide variation in such structural detail as the means by which plate 1 and pointer 15 are mounted in their several positions. Such variation would not depart from the principles of my invention as disclosed herein.

In accordance with the statutes I have made a clear, complete and concise description of my invention in the best form thus far known to me, and those skilled in the art will be informed thereby as to the advantages and as to the manner of use and making of my invention. It is to be understood that the foregoing details of the present description of my invention are illustrative and not in themselves to be taken as limiting the scope of protection afforded my invention, the bounds of which are rather to be determined by reference to the claims appended hereto.

I claim:

1. In combination, an adjustable indicating instrument including a pointer rotatable about a given axis, said pointer having a normal position in which it extends across an adjustable element of said instrument, and a calibrating position in which said pointer extends away from said adjustable element; a scale plate having a normal position in which it extends over said adjustable element and along the length of said pointer and between said pointer and said adjustable element and a calibrating position in which it extends away from said adjustable element and along the length of said pointer, means constructed and arranged to secure said pointer in either of its said positions and means arranged to secure said scale plate in either of its said positions; said adjustable element being constructed and arranged such as to permit adjustment of the manner in which said pointer indicates a given quantity applied to said indicating instrument so as to rotate said pointer, whereby it is possible to calibrate said pointer with reference to the same scale of values of said quantity by providing said scale as a series of indicia on said scale plate cooperating with said pointer in both positions of said scale plate and said pointer.

2. The invention of claim 1 including supporting structure for said instrument substantially surrounding that part of said indicating instrument not covered by said scale plate when the latter is in its said normal position.

3. The invention of claim 1 wherein in normal position the said given axis is located near an extremity of said scale plate.

4. The invention of claim 1 wherein each side of said scale plate is provided with indicia defining said scale of values, one set of indicia being located so as to permit the angular position of said pointer relative to said given axis to be read thereagainst when said scale plate and said pointer are in their normal positions, and another set of indicia being provided so located as to permit the angular position of said pointer relative to said given axis to be read thereagainst when said scale plate and said pointer are in their calibrating positions.

5. The method of calibrating an adjustable indicating instrument having a rotatable pointer and a scale plate for said pointer, said scale plate overlying an adjustable element of said instrument with said plate lying between said adjustable element and said pointer in normal use of said indicating instrument, including the steps of removing said pointer and said scale plate so as to expose said adjustable element, resecuring said pointer and said scale plate to said indicating instrument but with both said pointer and said scale plate each deflected about the axis of rotation of said pointer the same predetermined amount, said predetermined amount being sufficient to expose said adjustable element to access for adjustment from the direction of said pointer and past the said scale plate, adjusting said adjustable element to cause deflections of said pointer, relative to a given scale of values represented on said scale plate, to conform to a predetermined standard, whereby if said plate be provided with indicia means corresponding to said scale of values in resecured position of said pointer and said scale plate, after completion of calibration, said scale plate and said pointer can be restored to their positions in normal use without disturbing the relation of the deflections of said pointer relative to said scale of values.

6. The invention of claim 5 wherein said scale of values is represented by two scales of indicia, one over the other but on opposite sides of said scale plate, and including the steps of flipping said scale plate and said pointer over about an axis normal to the axis of deflection of said pointer both when resecuring and when restoring said scale plate and said pointer to their several positions as aforesaid.

References Cited in the file of this patent

UNITED STATES PATENTS 1,919,106   Hamernick _____ July 18, 1933